(12) United States Patent
Burstyn (10) Patent No.: US 7,634,089 B1
(45) Date of Patent: Dec. 15, 2009

(54) CINEMA ANTI-PIRACY MEASURES

(75) Inventor: Herschel Clement Burstyn, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 810 days.

(21) Appl. No.: 09/679,320

(22) Filed: Oct. 4, 2000

Related U.S. Application Data (60) Provisional application No. 60/162,553, filed on Oct. 26, 1999, provisional application No. 60/178,618, filed on Jan. 28, 2000, provisional application No. 60/188,897, filed on Mar. 13, 2000, provisional application No. 60/195,612, filed on Apr. 6, 2000, provisional application No. 60/199,065, filed on Apr. 20, 2000.

(51) Int. Cl.
 *H04N 7/167* (2006.01)
(52) U.S. Cl. .............. 380/201; 380/200; 380/213; 380/214; 380/218; 713/176; 726/26; 382/135
(58) Field of Classification Search ............. 380/218, 380/201, 204, 224, 200, 213–214; 386/31; 382/135; 713/176; 726/26
 See application file for complete search history.

(56) References Cited

U.S. PATENT DOCUMENTS

| | | | | |
|---|---|---|---|---|
| 4,964,162 A | * | 10/1990 | McAdam et al. | ............. 380/215 |
| 5,012,329 A | * | 4/1991 | Lang et al. | ................... 348/667 |
| 5,515,107 A | | 5/1996 | Chiang et al. | |
| 5,621,794 A | | 4/1997 | Matsuda et al. | |
| 5,668,603 A | * | 9/1997 | Copeland | .................... 348/473 |
| 5,680,454 A | | 10/1997 | Mead | |
| 5,687,191 A | * | 11/1997 | Lee et al. | ..................... 375/216 |
| 5,737,417 A | | 4/1998 | Buynak et al. | |
| 5,894,518 A | | 4/1999 | Shiojiri | |
| 5,900,886 A | | 5/1999 | Shay | |
| 5,924,013 A | * | 7/1999 | Guido et al. | .................. 725/67 |
| 5,959,717 A | | 9/1999 | Chaum | |
| 5,982,416 A | | 11/1999 | Ishii et al. | |
| 6,018,374 A | | 1/2000 | Wrobleski | |
| 6,021,199 A | | 2/2000 | Ishibashi | |
| 6,037,984 A | | 3/2000 | Isnardi et al. | |
| 6,173,109 B1 | | 1/2001 | Quan | |

(Continued)

FOREIGN PATENT DOCUMENTS

EP 0519320 12/1992

(Continued)

OTHER PUBLICATIONS

Graf et al. Video Scrambling and Descrambiling for Satellite and Cable TV, 1998, Newnes, Second Edition, pp. 3-4.*

(Continued)

*Primary Examiner*—Kristine Kincaid
*Assistant Examiner*—Yin-Chen Shaw
(74) *Attorney, Agent, or Firm*—Lowenstein Sandler PC (57) ABSTRACT

An anti-piracy system introduces distortion into a recorded image, while maintaining a high quality projected image. The video source material includes modulated entities for providing artifacts incompatible with the content of the video source material and selectively deliverable information that the projection system uses to demodulate the entities. A projector receives the information about the modulated entity and corrects, or demodulates, the entity. The projection system also imposes a recording device dependent interference on the projected images.

15 Claims, 5 Drawing Sheets

U.S. PATENT DOCUMENTS

| | | | |
|---|---|---|---|
| 6,400,826 B1 * | 6/2002 | Chen et al. | 382/100 |
| 6,438,251 B1 * | 8/2002 | Yamaguchi | 382/100 |
| 6,668,246 B1 * | 12/2003 | Yeung et al. | 705/57 |
| 6,683,957 B1 * | 1/2004 | Shin | 380/54 |
| 6,992,718 B1 * | 1/2006 | Takahara | 348/333.09 |
| 2001/0016058 A1 * | 8/2001 | Zeng | 382/135 |
| 2006/0005029 A1 * | 1/2006 | Petrovic et al. | 713/176 |

FOREIGN PATENT DOCUMENTS

| | | |
|---|---|---|
| EP | 0851678 | 7/1998 |
| WO | WO0074366 | 12/2000 |

OTHER PUBLICATIONS

Harmonic: TRANsend digital headend gains video-on-demand capabilities, M2 Presswire, Coventry, May 28, 1991, pg. 1.*

* cited by examiner

| MODULATION INFORMATION |
|---|
| SHAPE |
| CENT?? |
| SIZE |
| VERTICES |
| PARAMETER |
| MAPPING |
| SYNCHRONIZATION |
|  |
|  |
|  |
|  |

CINEMA ANTI-PIRACY MEASURES

CROSS REFERENCE TO RELATED APPLICATIONS

This application relates to Provisional Application Ser. No. 60/162,553, entitled, "ANTI-CINEMA PIRACY," filed on Oct. 29, 1999, Provisional Application Ser. No. 60/178,618, entitled "ANTI-CINEMA PIRACY," filed on Jan. 28, 2000, Provisional Application Ser. No. 60/188,897, entitled "ANTI-PIRACY USING CHROMATIC AND INTENSITY FLICKER MEASURES," filed on Mar. 13, 2000, Provisional Application Ser. No. 60/195,612 entitled "ANTI-PIRACY AND WATERMARK TECHNOLOGY," filed on Apr. 6, 2000, and Non-provisional application Ser. No. 09/592,472 entitled "METHOD AND APPARATUS FOR FILM ANTI-PIRACY," filed on May 25, 200, which are assigned to the same assignee and are incorporated by reference herein. Applicants claim the benefit of the priority filing dates of Oct. 29, 1999, Jan. 28, 2000, Mar. 13, 2000 and Apr. 6, 2000 pursuant to 35 U.S.C. § 119(e)(1) and May 25, 2000 pursuant to 35 U.S.C. § 120.

FIELD OF THE INVENTION

The invention is related to the field of film and video projection, and more particularly to preventing the illegal recording of film and video.

BACKGROUND OF THE INVENTION

Each year the film industry loses millions of dollars in revenue due to the illegal copying and reselling of movies. Movie pirates illegally copy movies by capturing the projected image with a video-recording device, such as a camcorder. Camcorders can be used in a dark movie theater to illegally record both the projected image and the corresponding audio. The illegal copy of the image, recorded on videotape, can be repeatedly recopied and sold to the public. Movie pirates often package these illegal copies in a manner to cause a purchaser to believe that a legitimate copy of the movie has been purchased.

In response to widespread cinema piracy, there have been various methods attempted to distort the projected image such that an illegal copy is unpleasant to view. No acceptable methods exist, however, for adding distortion without unacceptably degrading the projected image as it plays to the legitimate viewers. In addition, no methods have been suggested for altering the video source material in such a way that it is unpleasant to view in its raw form. There is a need, therefore, for a system and method for distorting an illegally recorded image, while still maintaining a high quality image for the legitimate viewing audience.

SUMMARY OF THE INVENTION

An anti-piracy system according to the principles of the invention introduces distortion into video source material and into an illegally copied image, while maintaining a high quality image for viewing by the legitimate audience. In an exemplary system for distorting a recording of projected images, the video source material includes modulated entities for providing artifacts incompatible with the content of the video source material and selectively deliverable information that the projection system uses to demodulate the entities. The modulated entities can be, for example, shapes on the video content having an emphasized or de-emphasized color. The projection system receives the information specifying the modulated entity (modulation information) and corrects, or demodulates, the entity. The projection system can also impose a recording device dependent interference on the projected images. In this manner, both the originating video source material and recorded copies contain artifacts that degrade content of the material while maintaining high quality for legitimately viewed renditions.

BRIEF DESCRIPTION OF THE DRAWINGS

The features of the invention will appear more fully upon consideration of the embodiments to be described in detail in connection with the accompanying drawings, in which.

DETAILED DESCRIPTION

This detailed description sets forth exemplary methods and systems for distorting an image recorded from projected film or video without appreciably degrading the projected information. An exemplary system introduces a distorting signal to the projected image that is substantially imperceptible to a viewer. When a recording camera records the projected image, a viewable distortion appears during playback of the recorded image. The video source material serves as the platform for a distorting signal, which decreases the availability of inexpensive countermeasures, makes the video source material unpleasant to view in its raw form, and permits the purveyor to retain control of the video source material content.

A. Projection and Recording

Figure 1A:
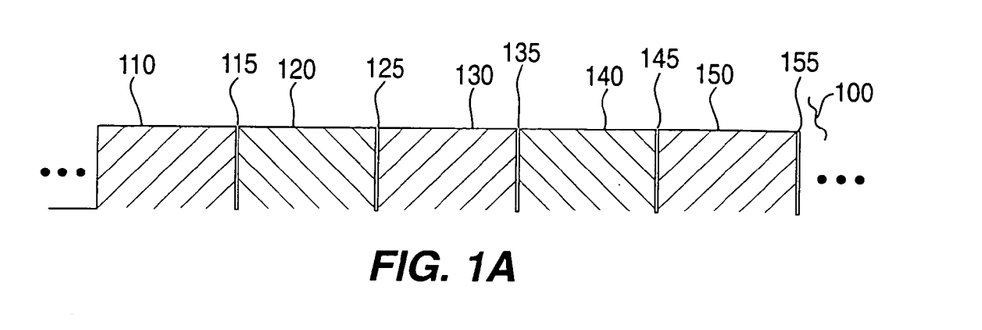
FIGS. 1A and 1B are timing diagrams for a projected image and a video recorder.

Projecting a series of slightly different images that are changed at a rate faster than is perceived by the eye creates motion pictures. The eye ignores the disruption in the projected image by integrating a previous image with a subsequent image. In FIG. 1A, a film projector timing diagram 100 illustrates the projection of individual images within five frames 110, 120, 130, 140 and 150. In this example, a first image is projected for a finite time, as represented by frame 110. The image changes at the conclusion of the frame time. To make this change, the projected image is interrupted for a short time, as illustrated by interval 115. During the interval 115, a second image is prepared for projection, such as by placing image data before the projector light source (not shown). The second image is projected for the duration of the second frame, as at 120. At the conclusion of this frame 120, the projected image is again interrupted to change to a third image. The interruption time is represented by interval 125. For each image contained on the film there is a projection period and a corresponding interruption period. The interruptions are represented in the timing diagram 100 at 125, 135, 145 and 155.

The projection can be characterized by various parameters, including the frame rate and the duty cycle. For the projection represented in diagram 100, the effective frame rate is 24 frames per second. (The actual frame rate is 48 frames per second, but the same image is projected twice). The projection to interruption ratio in each frame is known as the duty cycle, which impacts perceived brightness and the strength of the interference in the recorded image. Viewers cannot discern distinct frames when the frame rate exceeds a certain frequency. The eye retains the previous image and integrates it with the next image. Because the images are slightly different, the audience sees motion.

Figure 1B:
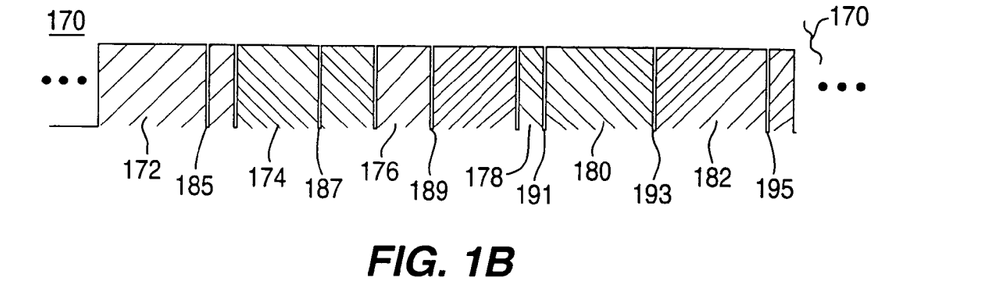

A video-recording device operates similarly to a film or video projector (images are recorded during finite periods). FIG. 1B illustrates a video recording timing diagram 170, where the recording device records image data during finite periods. The field exposures occur at a regular rate, such as 60 Hz for NTSC (National Television Standards Committee) and 50 Hz for PAL (Phase Alternating Line). In NTSC, video recording occurs at 30 frames per second, as two interlaced (odd line and even line) scans of an image are recorded in each cycle. This rate can be controlled by, for example, a mechanical or electronic shutter, which is closed for only a fraction of each field. In the diagram 170, image data is recorded in the frames shown at 172, 174, 176, 178, 180 and 182, with non-recording periods shown at 185, 187, 189, 191 and 193. During the playback of the recorded image, the interruptions of the recorded image remain undetected, because the eye integrates the image from one field to the next. The integrating over a finite period typical of a taking camera provides a basis for introducing recording device dependent interference in a projected image.

B. Functional Block Diagram of an Exemplary System

Figure 2:
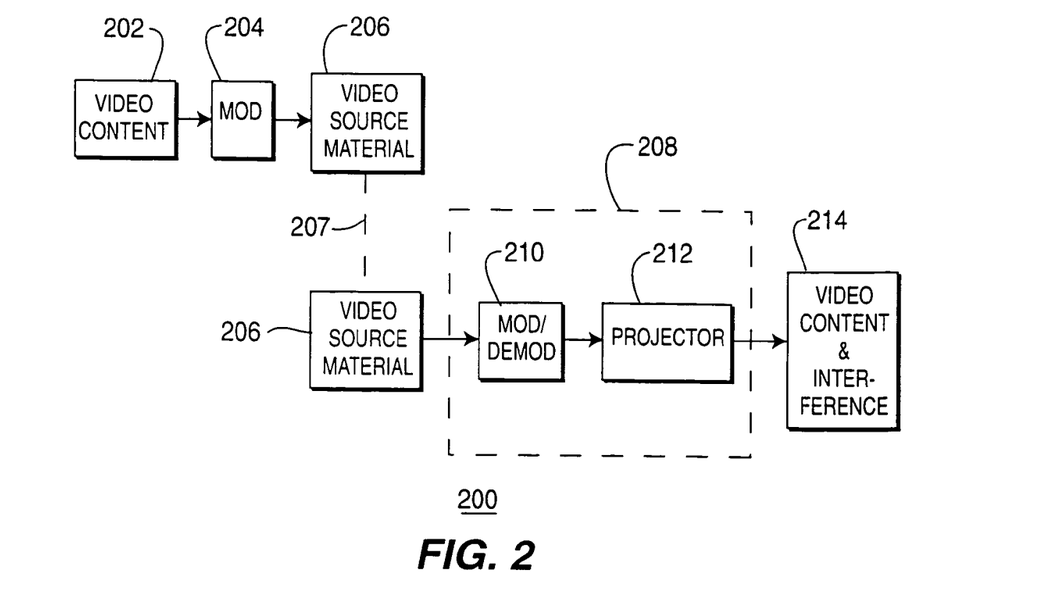
FIG. 2 is a functional block diagram for an exemplary system according to the principles of the invention.

A functional block diagram for an exemplary system 200 for distorting a recorded image is illustrated in FIG. 2. In this system 200, a modulator 204 modulates selected parameters of video content 202 to render the video content unpleasant to view. The video content is the information that is intended for projection, such as the scene information in a motion picture for display in a cinema. The modulator 204, as will be more fully explained hereafter, modulates parameters of selected entities in the video content. The modulated entities, also called multi-frame entities, are realizable images that can be viewable during projection of the modulated video content. The modulator 204 provides the video source material 206 for the system, which contains the video content, the modulated entities, and the modulation information. The modulation information specifies the modulated entities and is used to demodulate the video source material 206 during projection.

A dashed line 207 indicates that the remaining functions of the system 200 are typically carried out physically remote from the functions described above. A projection system 208, consisting of a modulator/demodulator 210 and a projector 212, processes the video source material 206 to provide projection of the video content to a viewing audience. The modulator/demodulator 210 processes the video source material and performs two functions. The demodulator 210 removes (or demodulates) the modulated entities using the modulation information provided in the video source material, and the modulator 210 imparts a recording device dependent interference on the video source material. A recording device dependent interference is an interference that is imperceptible to a human viewer but which appears on a recording of the projected video content. The projector 212 projects the video content with the recording device dependent interference 214.

In this exemplary projection system 208, the modulator/demodulator 210 is shown as a single functional block, because the same processing that demodulates the modulated entities imparts the recording device dependent interference. Separate modulators and demodulators can be used, however, without departing from the principles of the invention. Likewise, the modulator/demodulator is shown acting upon the video source material prior to projection. The projection functions, however, can be implemented prior to modulation and demodulation functions without departing from the principles of the invention.

The video source material 206 can be film, a digital video signal, or any video information that can be used by projection apparatus to create projected or displayed images. When the video source material 206 is film, the modulation information can be encoded on the film, and the projection system 208 includes a decoder (not shown) for decoding the modulation information. The modulation information and the video content need not comprise a single information entity, however. Where the modulation information and video content do not constitute a single entity, the dashed line 207 is a link for transferring the information to the projection system 208.

In one embodiment, the modulation information is downloadable from a remote source over a communications link. This permits the film purveyor to provide the modulation keys separately from the video content, rendering successful countermeasures unlikely. Of course the provision of the modulation information need not occur statically, but can be provided dynamically while the video content is being shown. The system could include a transmitter and receiver for establishing the link, so that the purveyor could provide the modulation keys without providing a permanent copy of the information (as would be the case if the information were part of the video content).

C. Exemplary Video Source Material

Video source material according to the principles of the invention can include the video content, entities that are incompatible with the video content, and the keys the projection system requires to render the entities imperceptible to a human during projection. The entities can be any realizable image, including a unique watermark. The keys are selectively deliverable to those who are approved to show the video content. Selectively deliverable means that the content provider can control who receives the information required to remove the entities. Without the keys, entities that can be seen by a human will appear on the video content.

Figure 3A:
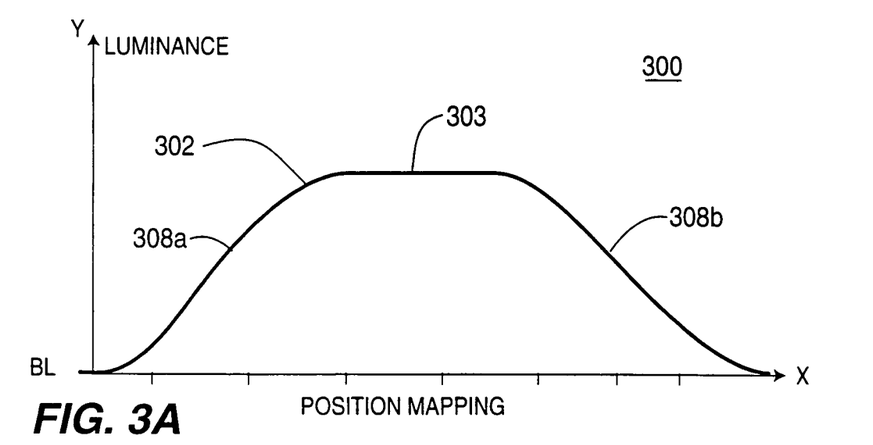
FIGS. 3A to 3C illustrate exemplary video source material in accordance with the principles of the invention.

In one embodiment, entities are created by emphasizing or de-emphasizing selected colors on the video source material, upsetting the correct color balance for the rendition. This color modulation can be used to create colored shapes on the video content. FIG. 3A illustrates a color modulation 300 diagram according to the principles of the invention. The X-axis plots a mapping to position on the video content. The Y-axis plots a modulation parameter, which, in this instance is color intensity (luminance or irradiance), although the parameter can be any of several, such as duty cycle or frequency. The resulting curve 302 defines a modulation envelope as a function of position on the video content. The value BL is the intensity base line for the color represented in the diagram 300. The base line is the average value for the rendition of the color that makes the color compatible with the video content. If the color intensity magnitude is emphasized or de-emphasized above a perceivable threshold, an artifact appears on the video content. Video material having a color with this exemplary modulation diagram will have the intensity of the color vary as a function of position of the video content. The mapping is selected to create the desired shapes.

Figure 3B:
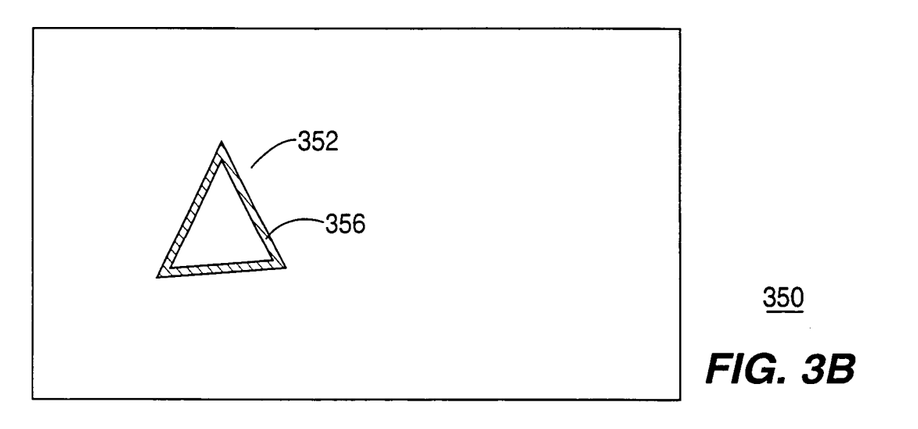

FIG. 3B illustrates exemplary video content 350 having a modulated entity 352 (video source material) imposed according to the modulation function 302 of FIG. 3A. The video source material is shown as if projected without post-processing to remove the artifact and without the remaining screen information. The shape of the artifact 352 is a triangle, which is created by mapping color gain to positions on the video content. For example, with reference to FIG. 3A, the flat portion 303 of the modulation curve 302 can represent color gain that is mapped to positions on the video content that cause a colored triangle to appear on the rendition, as in FIG. 3B.

The crosshatched area 356 defines a proximity of decreasing intensity corresponding to the tapering sections 308a and b of the modulation curve 302 of FIG. 3A. This proximity represents an intensity gain boost outside of the visible threshold. Decreasing the gain boost near the edges of the shape provides an error bar for possible misalignment with compensating demodulation that occurs during projection. The demodulation process will impose a color de-emphasis mapped to the same or nearly same position as the color emphasis.

Figure 3C:
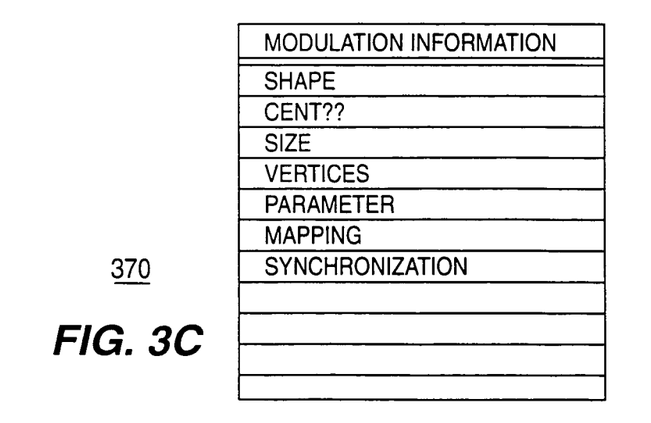

The table 370 of FIG. 3C represents exemplary modulation information for the video source material. The information can include shape, center position on the video content, orientation, color(s), modulation taper, size, vertices, parameter information, mapping information, synchronization information, or any other information required to remove the artifact upon projection. The modulation information further includes the keys to demodulate the video source material, and will depend upon the specific modulation in use.

Information concerning gain changes (or other modulation) is synchronized with the frame information. Where the video source material is film, the information can be encoded on the film and synchronized with the frame, similar to the encoding of audio information. Much of the pattern information can be stored in the modulator/demodulator, and the information stored on the film can provide selected information for carrying out the demodulation. For example, information such as shapes, modulation area and modulation style can be downloaded to the theater independent of the video content, and the content provider can limit its availability to the duration of the film showing. The track on the film then calls out the shape and provides a scale factor and an orientation for the shape, a location for the centroid, the modulation style (temporal or spatial, for example), the modulation depth, the taper (if any), and the modulation rate or scale factor.

Apparatus for creating the video source material can include color separators, amplifiers, filters and integrators. For example, for a film format, video content can be color separated and selected colors emphasized or de-emphasized spatially in each color field for each frame before the distribution copied is printed. Other methods and hardware should be apparent for imposing artifacts on video content according to the principles of the invention.

D. Exemplary Modulation/Demodulation—Color

Figure 4:
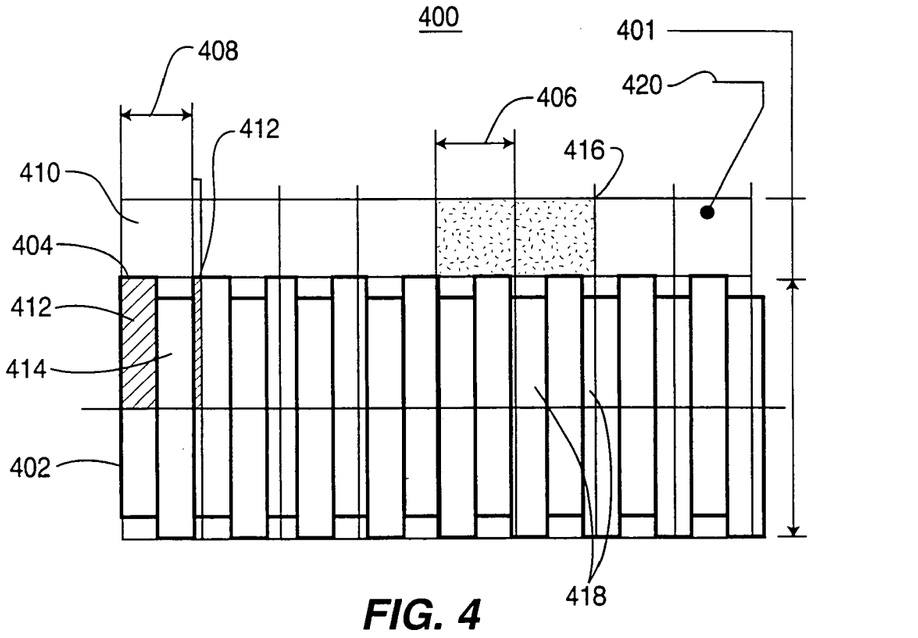
FIG. 4 illustrates exemplary modulation according to the principles of the invention.

Color modulation of a multi-frame entity is illustrated in the diagram 400 of FIG. 4. An entity need not be a physical image in the frame. In pyramid processing, for example, an entity can be a level in the resolution decimation. A spatial entity, for another example, is an area in the image defined by some algorithm. Generally, a multi-frame entity has a lifetime of a plurality of frames.

This multi-frame entity 401 is an orange patch in the image field formed by displaying red 402 and green 404 signals nominally 180 degrees out of phase. The signals are shown as square waves, although other signal shapes, such as sinusoids, are appropriate. The frame period 406 is greater than the modulation period 408 for the green 404 and red 402 signals. The modulation is sufficiently fast that a viewer perceives the effective color without flicker. An explanation of flicker and modulation thresholds is given in Wyszecki and Stiles, *Color Science Concepts and Methods, Quantitative Data and Formulae*, John Wiley & Sons, 2d ed., at 557 to 567. In addition, FIG. 4 illustrates color modulation at the effective frame rate, as at 420. This effectively parses the multi-frame entity into a frame dependent entity and a frame independent entity.

A recording camera sweeps the time-integrated signal at the end of every frame. For the first frame on the left 410, the area 412 under the green signal curve 404 represents the time-integrated value of the green signal 404 in the first frame 410. This area exceeds the area 414 under the red signal curve 402 for the same period 410. This frame, therefore, will be recorded with excess green. Similarly, the sixth frame 416 exhibits an excess of the red signal 418, which will be recorded by a taking camera integrating over the frame period. The recorded image will therefore exhibit a modulation period of about 10 frames, or based upon currently accepted video standards, a frequency of 3 Hz. The modulation threshold at 3 Hz is about 3%, and a recorded color modulation exceeding this threshold will appear as flicker in a playback of the recorded images.

Figure 5:
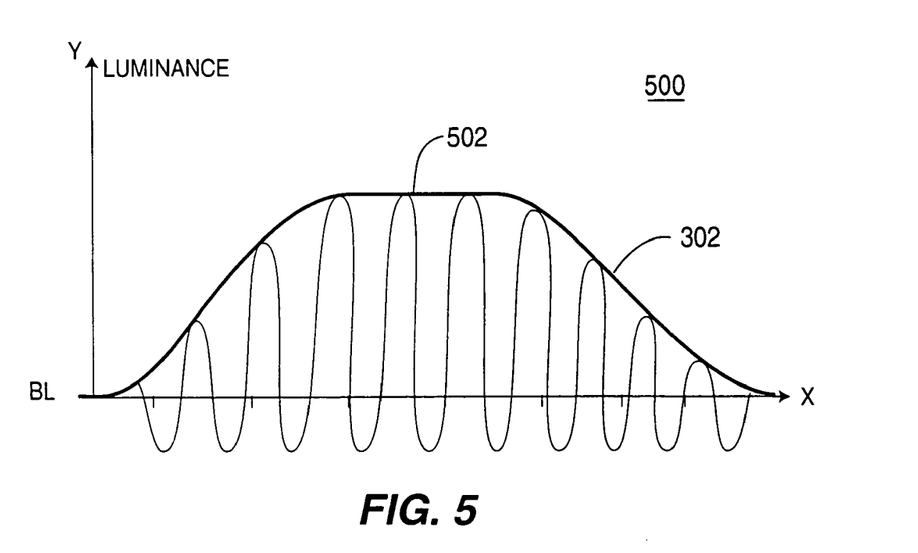
FIG. 5 illustrates exemplary demodulation according to the principles of the invention.

The color modulation induced flicker described with reference to FIG. 4 can also be used to demodulate the modulated entities described with reference to FIG. 3. Referring to FIG. 5, a modulation diagram 500 illustrates color modulation that demodulates entities imposed on the video source material. The modulation signal 502 has properties as described with reference to FIG. 4, such as having a period different from the frame period. The signal 502 is further modulated by the modulation envelope of the modulated entity, such as the envelope 302 of FIG. 3. The signal 502 is modulated such that it returns the modulated entity to the color base line. For example, if the multi-frame entity is a shape with a color emphasis, the signal 502 is modulated to de-emphasize the color and return it to the color baseline. The modulating signal 502 is chosen to implement the complement of the modulated entity.

Various other modulation/demodulation schemes also can be used without departing from the principles of the invention. For example, here the modulation signal 502 is a sinusoid, although it could be some other signal shape, such as a square wave. The modulation signal 502 is also illustrated with amplitude modulation, although other parameters can be modulated, such as duty cycle, frequency, or phase. Also, the signal 502 can represent a single color, or multiple color signals can be used, such as red and green to display an orange as in FIG. 4.

Spatial modulation can also be used to create artifacts. In spatial modulation, an image exhibiting periodicity (such as irradiance periodicity) with respect to space is imposed on the video content. The periodicity is designed to beat with the periodicity of a taking camera, introducing moiré in the recorded image. For example, if a spatial frequency on a CCD for a taking camera is f1, a multi-frame entity image with a spatial frequency f2 will cause moiré due to frequency components at f1+f2 and f1−f2. The periodicity can be introduced in the orange triangle of FIG. 4 by constructing the triangle with a checkerboard or line pattern. The color emphasis or de-emphasis in the video source material and in the demodulation is controlled by on-areas and off-areas instead of on-off times as in the time multiplexed color modulation discussed with respect to FIG. 4.

The appropriate spatial frequencies for use can be obtained from the parameters of the taking camera. Taking camera with 1024 pixels in the horizontal and vertical directions and a field of view of 50 degrees are currently available. Where every two pixels is a cycle, 1024 pixels is 512 cycles. Such a camera dictates a desired modulation of approximately 10 cycles per degree to achieve noticeable artifacts. Eye sensitivity at this spatial frequency is low; therefore, the periodicity of the imposed image should vary between 10 and 40 cycles per degree.

E. Exemplary Modulation/Demodulation Systems

Figure 6:
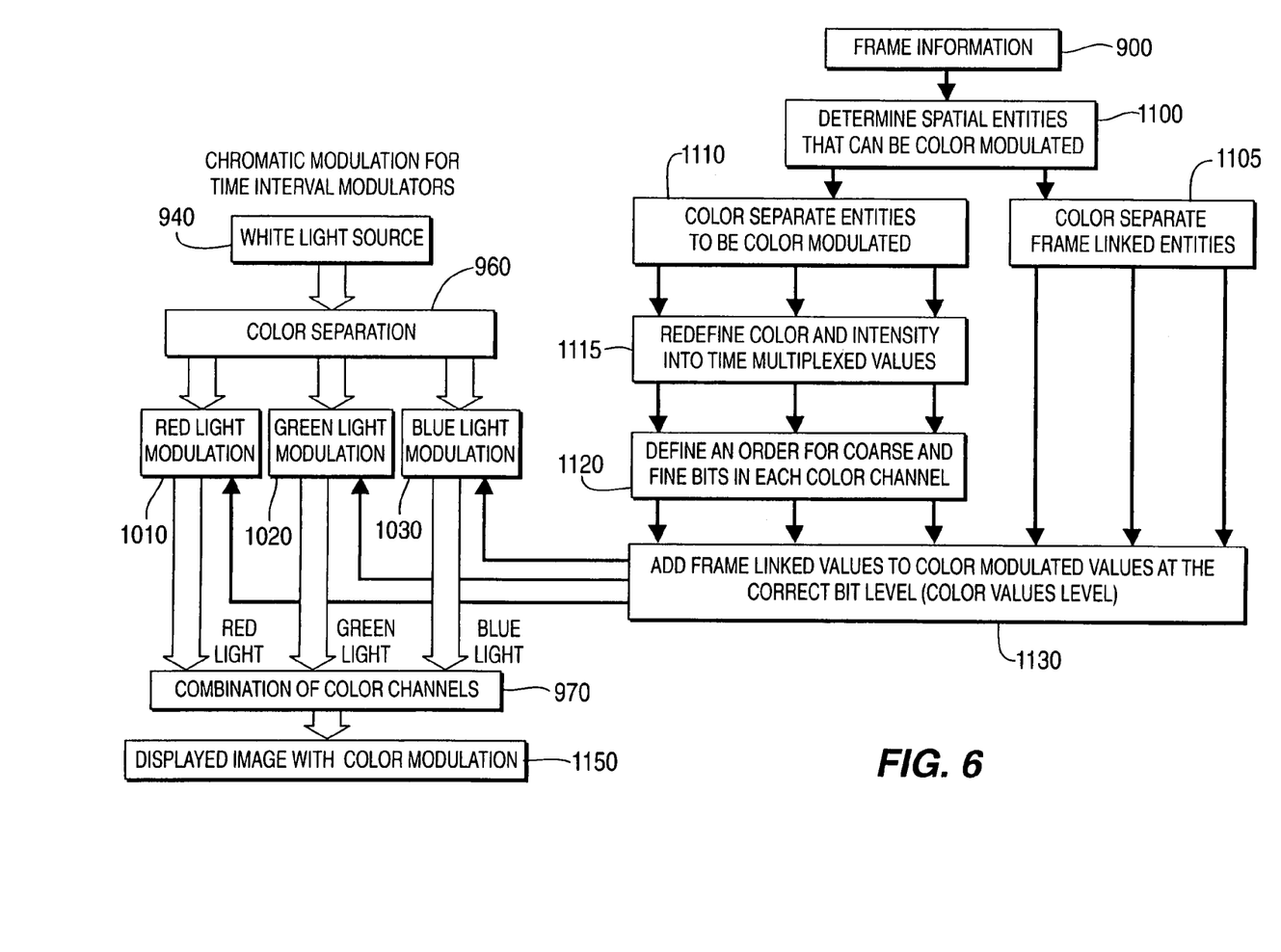
FIG. 6 illustrates an exemplary system for correcting video content and introducing alterations in recorded images according to the principles of the invention.

In FIG. 6, a system for altering a projected image using chromatic modulation of the image on a time basis is shown. In this system, an image splitter 1100 separates the frame information 900 provided by the video source material into frame-dependent (frame-linked) and frame-independent entities, as described with reference to FIG. 4. A separator 1140 separates the colors in the frame-independent and frame-linked entities. For the frame independent entities, the separate signals are redefined with time-multiplexed values by a processor 1115. An order of presentation of coarse and fine bits is defined for each color 1130. For instance, in one color channel a first frame of a frame pair can have coarse (wide time interval) intensity data presented at the end of the frame, while the subsequent frame has coarse data presented at the beginning of the frame. The frame pair for the second color channel can have its coarse data presented in reverse order. Bright data and dim data can be effectively clustered while maintaining average intensity values. A processor 1130 then combines this presentation data with the color-separated frame-linked entities.

Also in this exemplary system, a white light source 940 provides white light to a separator 960, which splits the white light 940 into component colors. A red modulator 1010, green modulator 1020 and blue modulator 1030 are responsive to these component colors and to the frame-linked and frame-independent entities and modulate the separated color image data for the entities. The color image data is chosen to be the complement of the data used to create the modulated entity. The modulated color image data is combined by the combiner 970, resulting in a displayed image with color modulation 1150 and with the modulated entities removed (as to a human viewer).

Figure 7:
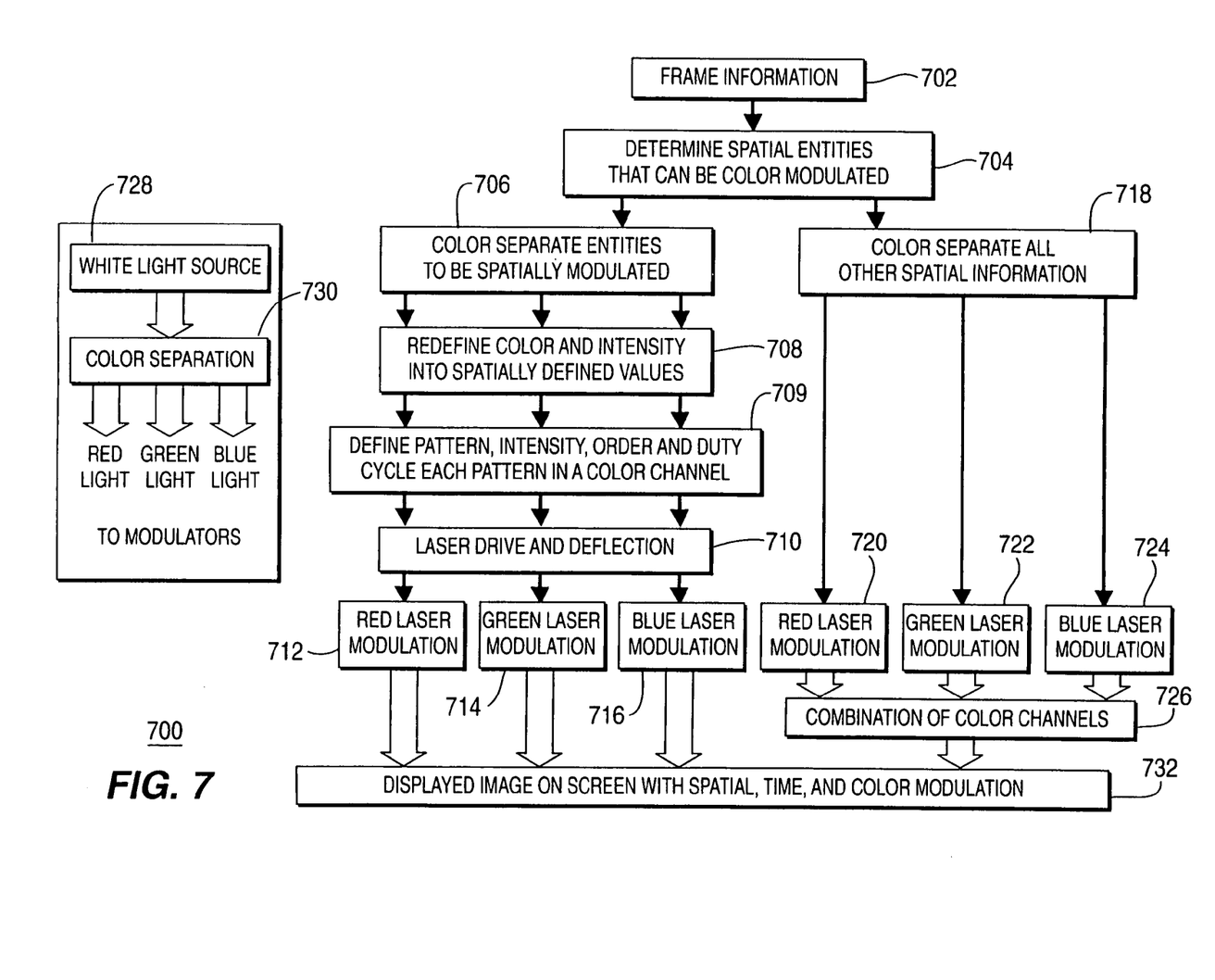
FIG. 7 shown another exemplary system for introducing alterations in recorded images according to the principles of the invention.

An exemplary modulator 700 for spatial-based intensity modulation is shown in FIG. 7. As in time-based modulation, the frame information 702 is input to the modulator from the video source material, and the modulated entities are identified 704. The entities to be spatially modulated are color-separated 706 and color and intensity are redefined into spatially defined values 708. These values will be the complement of the values of the modulated entities, resulting in demodulation of the entities. The pattern, intensity, order and duty cycle for each pattern are defined for each color channel, as at 709. This information can be stored on the modulator and called by the modulation information. A laser drive and deflection system 710 causes red 712, green 714 and blue 716 lasers to write the video content with the desired complementary values and periodicity. Use of the laser allows sufficient modulation depth (difference between bright and dim areas) for a noticeable beating effect.

To accomplish the rendition of the video content, the spatial information unrelated to the modulated entities are also color separated, as at 718. This information is modulated in the red 720, green 722 and blue 724 channels and combined as at 726. A white light source 728 is color separated 730 into red, green and blue and provides the excitement for the modulators 720, 722 and 724. The laser rendered information and the information rendered by the modulators combine to form the image on the screen 736.

F. Additional Modulation Techniques

The color modulation and modulation/demodulation techniques described above can be combined with other techniques to further defeat possible piracy countermeasures. The pattern also can be made to move on the screen at a rate that is not perceivable to a viewer but that will cause a beat frequency with the taking rate of the recording camera (a recording device dependent interference). The spatial frequency of the screen also can be changed to alter the beating effects with the spatially modulated entities and the taking camera.

As would be understood the principles of the invention disclosed are related to introducing alterations or distortions in film and video content as a method of rendering illegally obtained copies of the materials unpleasant to view. The principles of the invention may also be applied to other forms of content on other media, such as DVD and DVDX. The examples given herein are presented to enable those skilled in the art to more clearly understand and practice the invention. The examples should not be considered as limitations upon the scope of the invention, but as merely illustrative. Numerous modifications and alternative embodiments of the invention will be apparent to those skilled in the art in view of the foregoing description.

What is claimed is:

1. A method for distorting a recording of projected images, comprising the steps of:
    imposing modulated entities on video content of video source material, the modulated entities being incompatible with the video content, the imposing modulated entities including separating the video content into selected colors and varying at least one of a plurality of parameters of at least one of the selected colors;
    demodulating the modulated entities, wherein the demodulated entities are compatible with the video content; and
    projecting the video content to provide the projected entities;
    wherein the at least one parameter comprises intensity, the varying step including the step of determining the intensity as a function of position on the video content.

2. The method of claim 1 further comprising the step of selecting a space for modulating the video content.

3. The method of claim 1 further comprising the step of encoding modulation information corresponding to the modulated entities, wherein the projecting step further includes the step of decoding the modulation information.

4. The method of claim 2 wherein imposing the modulated entities further includes the step of modulating the video in the selected space.

5. A method for distorting a recording of projected images comprising the steps of:
    imposing modulated entities on video content of video source material, the modulated entities being incompatible with the video content, the imposing modulated entities including separating the video content into selected colors and varying at least one of a plurality of parameters of at least one of the selected colors;

demodulating the modulated entities, wherein the demodulated entities are compatible with the video content; and projecting the video content to provide the projected entities;

wherein the parameter comprises duty cycle, the varying step including the step of determining the duty cycle as a function of position on the video content.

6. A method for distorting a recording of projected images, comprising the steps of:

imposing modulated entities on video content of video source material, the modulated entities being incompatible with the video content, the imposing modulated entities including separating the video content into selected colors and varying at least one of a plurality of parameters of at least one of the selected colors;

demodulating the modulated entities, wherein the demodulated entities are compatible with the video content; and projecting the video content to provide the projected entities;

wherein the at least one parameter is selected from the Group comprising intensity, frequency, gain, brightness, luminance, duty cycle, amplitude, and wavelength; and wherein the varying step includes the step of determining a value of the parameter as a function of position on the video content, the function describing a modulation envelope, the modulation envelope decreasing a magnitude of the parameter to correct an alignment error.

7. The method of claim 1 wherein the video source material comprises film.

8. The method of claim 3 wherein the video source material comprises film, the encoding step including storing the modulation information on the film.

9. The method of claim 3 further comprising the step of varying the modulation information with respect to the video source material.

10. A system for distorting a recording of projected images, comprising:

video source material having modulated entities incompatible with a content of the video source material and having selectively deliverable modulation information; and a projector system responsive to the video source material to provide the projected images, the projector system including:

a modulator responsive to the video source material, the modulator imposing a recording device dependent interface on the projected images; and a demodulator responsive to the video source material for demodulating the modulated entities according to the selectively deliverable modulation information, wherein the demodulated entities are compatible with the content of the video source material;

wherein the modulated entities are spatial entities, the projection system including:

a scanner operable to scan a white light strip over a frame;

a color separator operable to separate the white light strip into color light strips; and a separator operable to separate the modulated entities into component colors, wherein the modulator modulates the component colors of the spatial entities over at least one of the color light strips.

11. The system of claim 10 wherein the video source material includes film and wherein the modulation information is encoded on the film.

12. The system of claim 10 wherein the modulated entities are color modulated and the modulator varies a projection rate of the modulated color.

13. The system of claim 10, wherein the projection system includes an electronic projection system and the modulation information includes information downloadable from a remote source.

14. The system of claim 10 wherein the modulation information includes packetized information.

15. The method of claim 1 wherein the projecting step includes the further step of imposing a recording device dependent interference on the projected video content.

* * * * *